United States Patent
Jeong et al.

(10) Patent No.: US 10,008,023 B2
(45) Date of Patent: Jun. 26, 2018

(54) METHOD AND DEVICE FOR TEXTURE FILTERING

(71) Applicant: SAMSUNG ELECTRONICS CO., LTD., Suwon-si (KR)

(72) Inventors: Seonghun Jeong, Yongin-si (KR); Sangheon Lee, Hwaseong-si (KR); Sunmin Kwon, Seoul (KR); Hoyoung Kim, Seoul (KR); Heejun Shim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 101 days.

(21) Appl. No.: 15/145,494

(22) Filed: May 3, 2016

(65) Prior Publication Data

US 2017/0103565 A1 Apr. 13, 2017

(30) Foreign Application Priority Data

Oct. 13, 2015 (KR) ........................ 10-2015-0143043

(51) Int. Cl.
| | |
|---|---|
| *G06T 15/04* | (2011.01) |
| *G06T 7/60* | (2017.01) |
| *G06T 7/00* | (2017.01) |
| *G06K 9/62* | (2006.01) |
| *G06T 7/90* | (2017.01) |

(52) U.S. Cl.
CPC ............ *G06T 15/04* (2013.01); *G06K 9/6201* (2013.01); *G06T 7/00* (2013.01); *G06T 7/60* (2013.01); *G06T 7/90* (2017.01); *G06T 2200/04* (2013.01); *G06T 2207/20024* (2013.01); *G06T 2210/36* (2013.01)

(58) Field of Classification Search
CPC ..... G06T 15/04; G06T 15/005; G06T 11/001; G06T 2210/36; A63F 2300/66; A63F 2300/6615
See application file for complete search history.

(56) References Cited

U.S. PATENT DOCUMENTS

| | | | |
|---|---|---|---|
| 6,304,268 B1 | 10/2001 | Iourcha et al. | |
| 6,891,546 B1 | 5/2005 | Park et al. | |
| 7,116,335 B2 | 10/2006 | Pearce et al. | |
| 7,456,846 B1 * | 11/2008 | King | G06T 15/005 345/613 |
| 2003/0030646 A1 * | 2/2003 | Yeh | G06T 15/04 345/582 |
| 2012/0280973 A1 | 11/2012 | Nagy | |

FOREIGN PATENT DOCUMENTS

KR 10-0291628 B1 5/2001

* cited by examiner

*Primary Examiner* — Haixia Du
(74) *Attorney, Agent, or Firm* — F. Chau & Associates, LLC

(57) ABSTRACT

A method and a device for texture filtering include determining an upper mipmap and a lower mipmap based on a level of detail (LOD) value corresponding to a quad, obtaining first color values corresponding to the upper mipmap, obtaining second color values corresponding to the lower mipmap, and obtaining third color values of the pixels of the quad by using linear interpolation, based on the obtained first and second color values.

17 Claims, 12 Drawing Sheets

METHOD AND DEVICE FOR TEXTURE FILTERING

CROSS-REFERENCE TO RELATED APPLICATIONS

This application claims the benefit under 35 USC 119(a) of Korean Patent Application No. 10-2015-0143043 filed on Oct. 13, 2015 in the Korean Intellectual Property Office, the entire disclosure of which is incorporated herein by reference for all purposes.

BACKGROUND

1. Field

The following description relates to methods and devices for texture filtering.

2. Description of Related Art

Texturing techniques, also referred to as texture mapping, have been used to obtain a realistic image in a three-dimensional graphic system. Texturing or texture mapping indicates using a two-dimensional image to be applied or mapped onto a surface of a three-dimensional object in order to apply a texture to the surface of the three-dimensional object. The texture refers to a two-dimensional image, and dots in the texture respectively indicate texels and correspond to pixels with respect to a screen space. When an object surface with respect to a three-dimensional space corresponding to each pixel of a two-dimensional screen space is determined while operating a three-dimensional graphics pipeline, texels having texture coordinates corresponding to the object surface are calculated. Accordingly, texture mapping between the pixels and the texels may be performed. Here, pixels refer to picture elements and texels refer to texture elements. As a result, an image is able to be rendered of a three-dimensional object whose surfaces correspond to the information included in the textures.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a method of texture filtering includes determining an upper mipmap and a lower mipmap based on a level of detail (LOD) value corresponding to a quad, obtaining first color values, which are color values of the pixels comprised in the quad, corresponding to the upper mipmap, by using a coordinate representing coordinates of the pixels comprised in the quad, when each pixel comprised in the quad and each corresponding texel of the upper mipmap match, obtaining second color values, which are color values of the pixels comprised in the quad, in which the color values of the pixels correspond to the lower mipmap, with respect to each pixel comprised in the quad, and obtaining third color values of the pixels of the quad by using linear interpolation, based on the obtained first and second color values.

The coordinate may include a center coordinate located in a center of coordinates of the pixels comprised in the quad, and the obtaining of the first color values may include obtaining the first color values by using bilinear interpolation, based on the center coordinate, a coordinate located in a center of each texel corresponding to the pixels comprised in the quad, and a color value of each texel corresponding to the pixels comprised in the quad.

The obtaining of the first color values may include obtaining the first color values by using a color value of a closest texel from the upper mipmap when each pixel comprised in the quad does not match the corresponding texels of the upper mipmap.

The determining of the upper mipmap and the lower mipmap may include receiving information of the pixels comprising the quad and information of a mipmap to which the pixels of the quad are mapped, and determining the LOD value by using the received information.

The obtaining of the first color values may include confirming whether the LOD value is a prescribed value or greater, and the obtaining may include obtaining the first color values by using bilinear interpolation, based on a coordinate of each pixel of the quad, a center coordinate of each texel of the upper mipmap corresponding to each pixel of the quad, and a color value of each texel of the upper mipmap corresponding to each pixel of the quad, when the confirmed LOD value is same as or greater than the prescribed value.

The prescribed value may be 0.5.

The obtaining of the second color values may include obtaining the second color values of the pixels of the quad, which are mapped in the lower mipmap by using bilinear interpolation, based on a coordinate of each pixel of the quad, a center coordinate of each texel of the lower mipmap to which each pixel of the quad is mapped, and a color value of each texel of the lower mipmap mapped to each pixel.

The upper mipmap may include a low-resolution mipmap and the lower mipmap may include a high-resolution mipmap.

The lower mipmap may have a width that is two times a width of the upper mipmap and a height that is two times a height of the upper mipmap.

In another general aspect, a non-transitory computer-readable recording medium stores instructions for causing a processor/computer to perform the method described above.

In another general aspect, a device for texture filtering includes a mipmap determiner configured to determine an upper mipmap and a lower mipmap based on a level of detail (LOD) value corresponding to a quad, an upper mipmap processor configured to obtain first color values, which are color values of the pixels comprised in the quad, corresponding to the upper mipmap, by using a coordinate representing coordinates of the pixels comprised in the quad when each pixel comprised in the quad and each corresponding texel of the upper mipmap match, a lower mipmap processor configured to obtain second color values, which are color values of the pixels comprised in the quad, in which the color values of the pixels correspond to the lower mipmap, with respect to each pixel comprised in the quad, and a pixel value determiner configured to obtain third color values of the pixels of the quad by using bilinear interpolation, based on the determined first and second color values.

The coordinate may include a center coordinate located in a center of coordinates of the pixels comprised in the quad, and the upper mipmap processor may be further configured to obtain the first color values by using bilinear interpolation, based on the center coordinate, a coordinate located in a center of each texel corresponding to the pixels comprised in the quad, and a color values of each texel corresponding to the pixels comprised in the quad.

The upper mipmap processor may be further configured to obtain the first color values by using a color value of a closest texel from the upper mipmap when each pixel comprised in the quad does not match the corresponding texels of the upper mipmap.

The mipmap determiner may be further configured to receive information of the pixels comprising the quad and information of a mipmap to which the pixels of the quad are mapped, and to determine the LOD value by using the received information.

The upper mipmap processor may be further configured to confirm whether the LOD value is same as or greater than a prescribed value, and to obtain the first color values by using bilinear interpolation, based on a coordinate of each pixel of the quad, a center coordinate of each texel of the upper mipmap corresponding to each pixel of the quad, and a color value of each texel of the upper mipmap corresponding to each pixel of the quad, when the confirmed LOD value is same as or greater than the prescribed value.

The prescribed value may be 0.5.

The lower mipmap processor may be further configured to obtain the second color values of the pixels of the quad, which are mapped in the lower mipmap by using bilinear interpolation, based on a coordinate of each pixel of the quad, a center coordinate of each texel of the lower mipmap to which each pixel of the quad is mapped, and a color value of each texel of the lower mipmap mapped to each pixel.

The upper mipmap may include a low-resolution mipmap and the lower mipmap comprises a high-resolution mipmap.

The lower mipmap may have a width that is two times a width of the upper mipmap and a height that is two times a height of the upper mipmap.

Other features and aspects will be apparent from the following detailed description, the drawings, and the claims.

DETAILED DESCRIPTION

Figure 1:
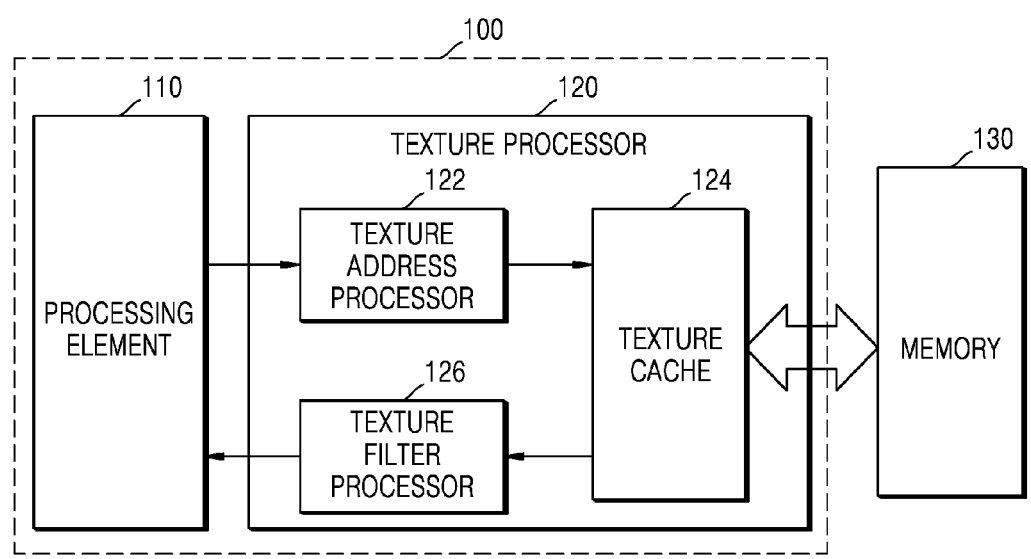
FIG. 1 is a configuration diagram of a graphic processor according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Reference is now be made in further detail to embodiments, examples of which are illustrated in the accompanying drawings, in which like reference numerals refer to like elements throughout. In this respect, the present embodiments possibly have different forms and are not to be construed as being limited to the descriptions set forth herein. Accordingly, the embodiments are merely described below, by referring to the figures, to explain aspects of various examples.

Advantages and features of the embodiments and implementation methods of the embodiments are clarified through the following embodiments, described with reference to the accompanying drawings. The embodiments may, however, be embodied in different forms and are not to be construed as being limited to the embodiments set forth herein. Rather, these embodiments are provided so that this disclosure is thorough and complete, and fully conveys the scope of the embodiments to those skilled in the art.

Terms used in the present specification are briefly described, and the present embodiments are described in further detail.

General and widely used terms are employed throughout, in consideration of functions provided in the embodiments, and potentially vary appropriately according to an intention of one of ordinary skill in the art, a precedent, or emergence of new technologies. Additionally, in some cases, specific terms may be selected, in which case, these specific terms are defined in order to provide the intended meaning of the terms as used in the description of the embodiments. Accordingly, it is to be understood that the terms used herein are to be interpreted as having a meaning that is consistent with their meaning in the context of the relevant art and are not to be interpreted in an idealized or overly formal sense unless expressly so defined.

Throughout the specification, when a portion "includes" an element, another element may be further included, rather than excluding the existence of the other element, unless otherwise described. In addition, a term "unit" as used in the specification indicates a hardware component such as field-programmable logic array (FPLA) and application-specific integrated circuit (ASIC), and the "unit" performs a particular function. However, the "unit" is not intended to be limited to particular hardware, and other appropriate hardware is used in other embodiments.

Below, a detailed description discusses the embodiments with reference to attached drawings such that it is possible to easily perform embodiments. In the description of the inventive concept, certain detailed explanations of the related art are omitted when it is deemed that they may unnecessarily obscure the essence of the inventive concept.

Provided are a method and a device for texture filtering.

Also provided is a non-transitory computer-readable recording medium that stores a program for performing the method by a computer.

FIG. 1 is a configuration diagram of a graphic processor 100 according to an embodiment.

Referring to the embodiment of FIG. 1, the graphic processor 100 includes a processing element 110 and a texture unit or texture processor 120. For example, the texture processor 120 includes a texture address unit or texture address processor 122, a texture cache 124, and a texture filter unit or texture filter processor 126.

The processing element 110 performs various graphic operations such as pixel shading or rasterizing, in addition to texture mapping, in the graphic processor 100. A texture includes linearly mapped data. For example, the texture data is formed of color values. Respective pixels in the texture data are denoted as texels. For example, each texel has a color value. Texture filtering is a method in which such color values of the texels are used by a shader in a graphics pipeline.

In such an embodiment, texture coordinates are designated in a range from 0.0 to 1.0 for the respective coordinate axes. For example, the texture address processor 122 determines a texture address corresponding to the textures. For example, the texture address processor 122 replaces the texture coordinates received from the processing element 110 with an address of the texture cache 124 in which a texture corresponding to the texture coordinates is stored.

The texture address processor 122 transmits addresses and texel data related to the addresses to the texture cache 124 accordingly. The texture cache 124 stores the texture information. For example, the texture cache 124 stores some of the texture information received from a memory 130 to minimize a graphic processing delay time that results from data transmission. For example, the texture cache 124 takes a texture that is not stored in the texture cache 124 from the memory 200. The texture cache 124, after receiving addresses from the texture address processor 122, returns texel data related to the addresses to the texture filter processor 126. When texel data requested from the memory 130 by the graphic processor 100 does not exist in the texture cache 124, the texture cache 124 receives the requested texel data from the memory 130 itself and transmit the requested texel data to the texture filter processor 126.

The texture filter processor 126 performs texture filtering by using texel values included in the texture information. For example, filtering texel values refers to blending texel values and obtaining a color value corresponding to each pixel based on the blending. For example, a requested texture is obtained by obtaining an average of texel values included in a partial region in a texture space in which a texture coordinate transmitted to the texture filter processor 126 is included. A value resulting from the texture filtering in the texture filter processor 126 is accordingly transmitted to the processing element 110. According to an example, a mode of the texture filtering performed in the texture filter processor 126 is one of various modes, for example, point filtering, bilinear filtering, or tri-linear filtering. However, these are only examples and other appropriate filtering approaches are used in other examples.

Point filtering refers to a mode of obtaining four peripheral texels based on the texture coordinate and outputting the nearest texel from the four peripheral texels when using a texture applied on an object to be rendered. Bilinear filtering indicates a mode for obtaining four peripheral texels based on the texture coordinate, interpolating each two of the texels, re-interpolating the interpolation results, and outputting a re-interpolation result when using a texture applied on an object to be rendered. Tri-linear filtering indicates a mode having four texels at two mipmap levels based on a texture coordinate and in which bilinear filtering is performed at each mipmap, and then bilinear filtering is re-performed with result values of the two mipmaps, and the re-performing result is the output.

Figures 2, 3:
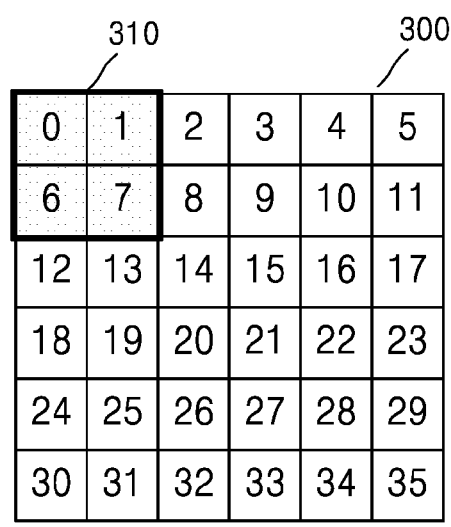
FIGS. 2 and 3 are views illustrating a relationship between a pixel coordinate and a quad, according to an embodiment.

FIGS. 2 and 3 are views illustrating a relationship between a pixel coordinate and a quad, according to an embodiment. Here, a quad refers to a set of four pixels used for the filtering.

Referring to the example of FIG. 2, the quad 200 includes four pixels P0 to P3. The quad 200 collectively indicates the four pixels with respect to the pixel coordinate 300.

Referring to the example of FIG. 3, the pixel coordinate 300 includes a quad 310. The pixel coordinate 300 includes a total of 36 pixels in a 6×6 pixels shape. The quad 310 may include pixel 0, pixel 1, pixel 6 and pixel 7. Additionally, pixel 2, pixel 3, pixel 8 and pixel 9 may form a quad. Texture mapping is performed based on quad units during texture filtering. For example, texture mapping is performed based on four pixel units during texture filtering.

Figure 4:
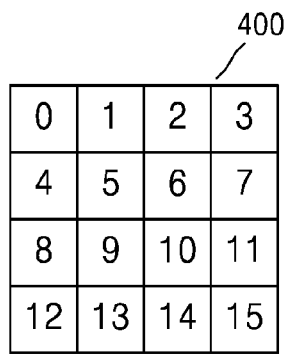
FIGS. 4 and 5 are views illustrating an upper mipmap and a lower mipmap according to an embodiment.
Figure 5:
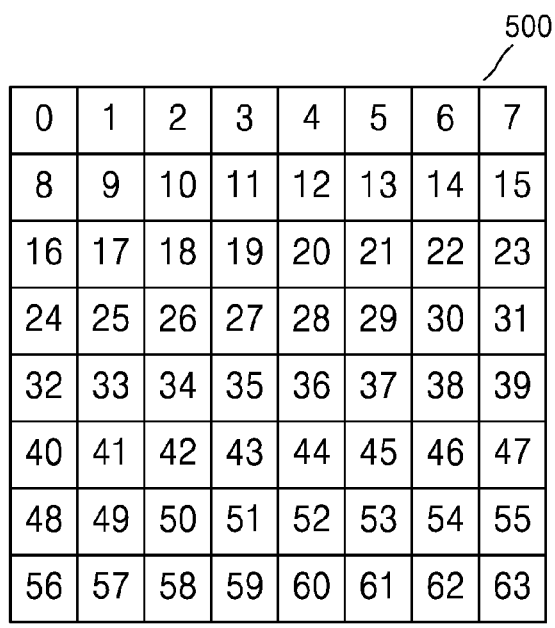

FIGS. 4 and 5 are views illustrating an upper mipmap and a lower mipmap, according to an embodiment.

In texture mapping for three-dimensional graphics, the mipmaps are a group of bitmap images including a basic texture and textures previously continuously reduced from the basic texture, used in order to improve a rendering speed.

For example, it is possible to use a basic texture when a texture appears larger than an original size of the texture. However, a reduced texture is possibly used for rendering instead when the basic texture is rendered to appear farther and smaller than the original size of the basic texture. As a result, the number of texels used for rendering decreases, and accordingly, a rendering speed increases because less data is required to be processed. For example, when a texture includes 256×256 pixels, a mipmap group thereof possibly has 8 images, each with a ¼ size of a previous image, such that each dimension is halved, that is, 128×128, 64×64, 32×32, 16×16, 8×8, 4×4, 2×2, or 1×1 pixels as these smaller images.

For example, a texture possibly has a size of a mipmap between 64×64 pixels and 32×32 pixels when rendering the texture in a size of 40×40 pixels, and a final image is obtained by using the generated mipmaps of 64×64 pixels and 32×32 pixels. A size of the mipmap gradually decreases from the largest mipmap to the smallest mipmap. Thus, when a size of a texture to be rendered is 40×40 pixels, pixel coordinates possibly have a set of 40×40 pixels. For example, a mipmap of 64×64 pixels is a lower mipmap located under the pixel coordinates, in that this mipmap is higher resolution than 40×40 pixels. Additionally, a mipmap of 32×32 pixels is an upper mipmap located over the pixel coordinates, in that this mipmap is lower resolution than 40×40 pixels.

FIG. 4 illustrates a mipmap 400 of 4×4 pixels, and FIG. 5 illustrates a mipmap 500 of 8×8 pixels. Referring to the example of FIG. 3, pixel coordinates have 6×6 pixels. Therefore, the pixel coordinates of FIG. 3 are in between a mipmap of 4×4 pixels and a mipmap of 8×8 pixels. As a size of the lowest mipmap is the largest and sizes of mipmaps become smaller in an upward direction, the mipmap of 4×4 pixels in an upper portion of the pixel coordinates is an upper mipmap. Furthermore, the mipmap of 8×8 pixels in a lower portion of the pixel coordinates is a lower mipmap. Therefore, the mipmap 400 illustrated in FIG. 4 is an upper mipmap. Also, the mipmap 500 illustrated in FIG. 5 is a lower mipmap. In addition, in FIGS. 3 and 4, a resolution of a mipmap becomes lower as the mipmap goes upward. Therefore, an upper mipmap has a lower resolution and a lower mipmap has a higher resolution. However, the opposite case is also possible. For example, if a resolution of a mipmap becomes higher as the mipmap goes upward, an upper mipmap has a higher-resolution and a lower mipmap has a lower-resolution. In this example, the mipmap of 4×4 pixels is a lower mipmap and the mipmap of 8×8 pixels is an upper mipmap.

Figure 6:
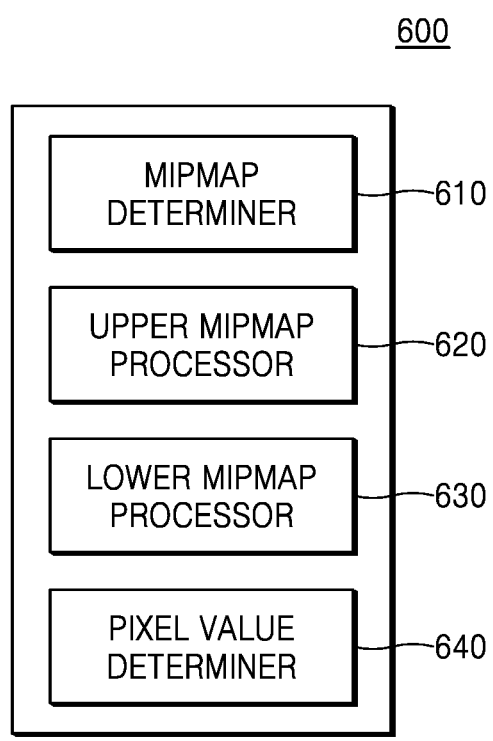
FIG. 6 is a configuration diagram of a texture filtering device according to an embodiment.

FIG. 6 is a configuration diagram of a texture filtering device 600 according to an embodiment.

Referring to the embodiment of FIG. 6, the texture filtering device 600 includes a mipmap determiner 610, an upper mipmap processor 620, a lower mipmap processor 630, and a pixel value determiner 640. For example, the texture filtering device 600 is included in the texture filter processor 126 of the embodiment of FIG. 1.

The mipmap determiner 610 determines an upper mipmap and a lower mipmap from a plurality of mipmaps by using a level of detail (LOD) value corresponding to a quad in an image to be rendered. For example, the LOD value indicates a change in a quality of a texture depending on distance by using a numerical value. For example, it is supposed that there are three mipmaps and an LOD value with respect to the three mipmaps is a value between 0 and 1. Furthermore, it is supposed in this example, where there are three mipmaps, that a first mipmap corresponds to an LOD value of 0, a second mipmap corresponds to an LOD value of 0.5, and a third mipmap corresponds to an LOD value of 1. Thus, when an LOD value of the quad coordinates is 0.7, the third mipmap may be an upper mipmap since the third mipmap corresponds to 1, which is the closest value greater than the LOD value of 0.7. In addition, the second mipmap, which corresponds to the LOD value of 0.5 that is the closest value less than the LOD value of 0.7, may be a lower mipmap.

The mipmap determiner 610 accordingly receives information of pixels configuring a quad. Furthermore, the mipmap determiner 610 receives information of a mipmap on which pixels of the quad are mapped. For example, the received information includes information of an LOD value of each mipmap. The received information further includes LOD values of pixels comprising the quad. Accordingly, the mipmap determiner 610 determines whether a mipmap is an upper mipmap or a lower mipmap by using the LOD values included in the received information, as discussed.

The upper mipmap processor 620 determines whether each pixel included in the quad matches a corresponding texel of the upper mipmap. For example, a pixel matches a corresponding texel when a pixel directly corresponds to a texel, and in this example the pixel and the corresponding texel are said to match, because the pixel has a color value for a part of a picture that is the same as a corresponding part of of the texture defined by the texel. When each pixel included in the quad corresponds to the same part of a picture as corresponding texel of the upper mipmap and the pixel and the texel accordingly match, the upper mipmap processor 620 then determines a center coordinate located in a center of a coordinate of the pixels. For example, if texels of the upper mipmap corresponding to the pixels 1 through 4 are texels 1 through 4 respectively, the upper mipmap processor 620 determines a center coordinate of each of the four pixel coordinates included in the quad. For example, the upper mipmap processor 620 obtains color values of pixels included in the quad, in which the color values of pixels correspond to the upper mipmap, by using the determined center coordinate, a coordinate located in a center of each texel corresponding to pixels in the quad and a color value of each texel corresponding to pixels in the quad. For example, the upper mipmap processor 620 obtains color values of pixels included in the quad mapped in the upper mipmap by using bilinear interpolation, as discussed above. In other words, variables used in a bilinear interpolation equation are the determined center coordinate, a coordinate located in a center of each texel corresponding to pixels in the quad, and a color value of each texel corresponding to pixels in the quad.

Furthermore, when each pixel included in the quad does not correspond to the same subject as a corresponding texel of the upper mipmap and hence the pixels and the texels do not match, the upper mipmap processor 620 then causes the color values of pixels included in the quad, in which the color values of pixels correspond to the upper mipmap, to be the same as a color value of a texel closest to the upper mipmap, in which each pixel of the quad is mapped. For example, when texels of the upper mipmap corresponding to pixel 1 are texels 1 through 4 and texels of the upper mipmap corresponding to pixel 2 are texels 3 through 6, the texels of the upper mipmap corresponding to each pixel are not identical with each other. In such an example, the pixels and the texels do not match and do not correspond to the same subject. Thus, when a texel closest to the upper mipmap in which pixel 1 is mapped is texel 1, a color value of pixel 1 mapped in the upper mipmap is the color value of texel 1. Similarly, when a texel closest to the upper mipmap in which pixel 2 is mapped is texel 6, a color value of pixel 2 mapped in the upper mipmap is a color value of texel 6.

For example, the upper mipmap processor 620 confirms whether the LOD value is same as or greater than a prescribed value. When the confirmed LOD value is same as or greater than the prescribed value, the upper mipmap processor 620 obtains color values of pixels included in the quad, in which the color values of pixels correspond to the upper mipmap, by using a coordinate of each pixel of the quad. For example, the upper mipmap processor 620 obtains color values of pixels included in the quad accordingly, in which the color values of pixels correspond to the upper mipmap, by using a coordinate of each pixel of the quad, a center coordinate of each texel of the upper mipmap corresponding to each pixel of the quad, and a color value of each texel of the upper mipmap corresponding to each pixel of the quad. Here, the upper mipmap processor 620 uses bilinear interpolation, as discussed. For example, when a prescribed LOD value is 0.5 and an LOD value corresponding to pixels of the quad is 0.5 or larger, the upper mipmap processor 620 obtains color values of pixels of the quad, respectively. However, when an LOD value corresponding to pixels of the quad is less than 0.5, the upper mipmap processor 620 obtains color values of pixels included in the quad, in which the color values of pixels correspond to the upper mipmap, by using a center coordinate of four pixel coordinates included in the quad.

Additionally, the lower mipmap processor 630 obtains color values of pixels included in the quad, in which the color values of the pixels correspond to the lower mipmap, with respect to each pixel included in the quad. For example, the lower mipmap processor 630 obtains color values of pixels mapped in the lower mipmap by using a coordinate of each pixel of the quad, a center coordinate of each texel of the lower mipmap in which each pixel is mapped, and a color value of each texel of the lower mipmap. The lower mipmap processor 630 obtains color values of pixels mapped in the lower mipmap by using bilinear interpolation, as discussed.

The pixel value determiner 640 obtains color values of pixels included in the quad by using the color values of pixels included in the quad, in which the color values of pixels correspond to the upper mipmap, and the color values of pixels mapped in the lower mipmap. The pixel value determiner 640 obtains the color values of pixels included in the quad by applying linear interpolation with respect to the color values of pixels included in the quad, in which the color values of pixels correspond to the upper mipmap, and the color values of pixels mapped in the lower mipmap. For example, the pixel value determiner 640 obtains the color values of pixels included in the quad by using a color value obtained corresponding to the upper mipmap and a color value obtained corresponding to the lower mipmap. Linear interpolation is applied to this information, as discussed.

Figure 7:
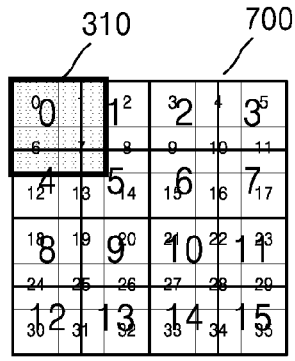
FIGS. 7 and 8 are views illustrating a relationship between a quad and a mipmap according to an embodiment.
Figure 8:
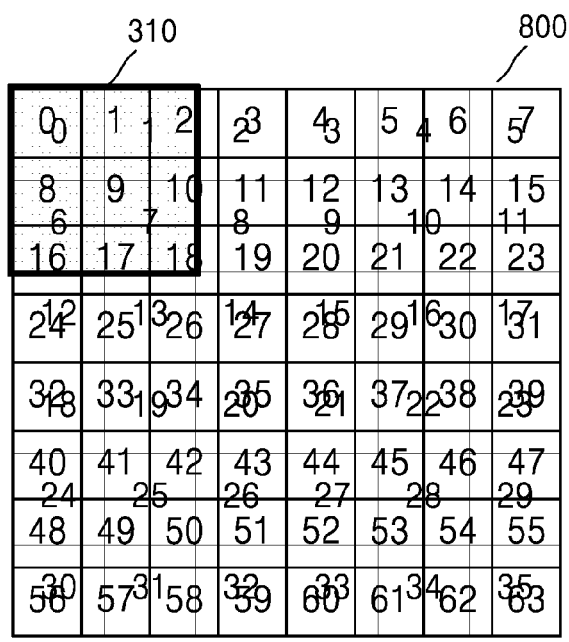

FIGS. 7 and 8 are views illustrating a relationship between a quad and a mipmap according to an embodiment.

FIG. 7 illustrates the pixel coordinate 300 of FIG. 3 and an upper mipmap 700 mapped from the upper mipmap 400 of FIG. 4. Furthermore, the example of FIG. 7 illustrates a quad 310 of the pixel coordinate 300 in the mapped upper mipmap 700. In addition, FIG. 8 illustrates the pixel coordinate 300 of FIG. 3 and a lower mipmap 800 mapped from the lower mipmap 500 of FIG. 5. Furthermore, the example of FIG. 8 illustrates a quad 310 of the pixel coordinate 300 in the mapped lower mipmap 800.

In general, a tri-linear filtering value, such as a color value, corresponding to pixel 0 of the pixel coordinate 300 is obtained by using linear interpolation, based on a color value of texels 0, 1, 8 and 9 in the lower mipmap 500 and a color value obtained by using bilinear interpolation based on a coordinate center of texels 0, 1, 8 and 9 and a coordinate of pixel 0, and based on a color value of texels 0, 1, 4 and 5 in the upper mipmap 400 and a color value obtained by using bilinear interpolation based on a coordinate center of texels 0, 1, 4 and 5 and a coordinate of pixel 0.

Referring to the example of FIG. 7, pixels 0, 1, 6 and 7 correspond to texels 0, 1, 4 and 5 in the mapped upper mipmap 700, respectively. However, referring to the example of FIG. 8, pixel 0 corresponds to texels 0, 1, 8 and 9 in the mapped lower mipmap 800, and pixel 1 corresponds to texels 1, 2, 9 and 10 in the mapped lower mipmap 800. Furthermore, pixel 6 corresponds to texels 8, 9, 16 and 17 in the mapped lower mipmap 800. Furthermore, pixel 7 corresponds to texels 9, 10, 17 and 18 in the mapped lower mipmap 800. In other words, corresponding texels change per pixel between different mipmaps.

Therefore, unlike in the mapped lower mipmap 800, pixels 0, 1, 6 and 7 correspond to an identical texel in the mapped upper mipmap 700. Accordingly, it is possible to obtain color values of pixels by using a center coordinate of pixel coordinates, a center coordinate of each texel corresponding to each pixel of the quad, and a color value of each texel corresponding to each pixel of the quad without separately calculating per pixel. Thus, a calculation amount is accordingly reduced.

Figure 9:
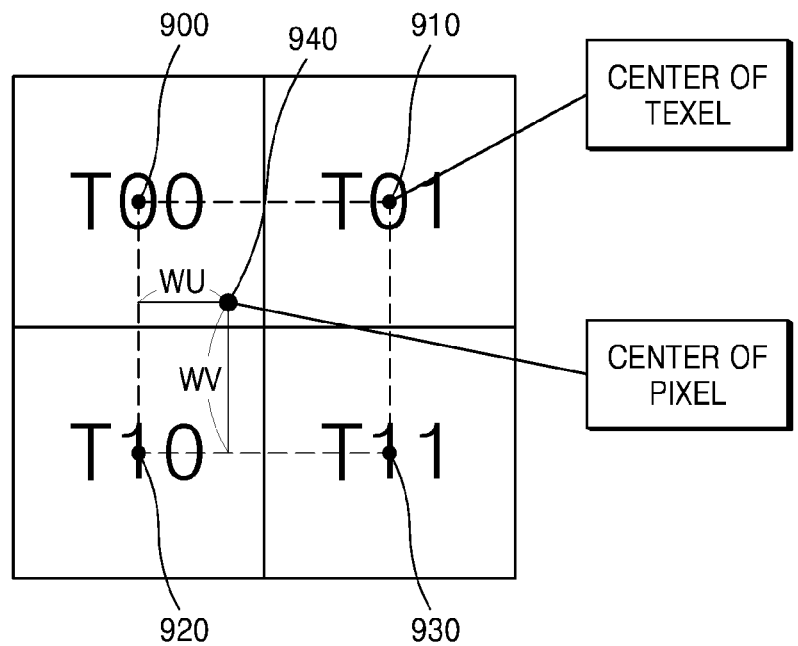
FIG. 9 is a view illustrating a method of texture filtering according to an embodiment.

FIG. 9 is a view illustrating a method of texture filtering according to an embodiment.

FIG. 9 illustrates a relationship of texels and pixels through a center coordinate 940 located in a center of a coordinate of pixels, a center 900 of T00 texel, a center 910 of T01 texel, a center 920 of T10 texel, and a center 930 of T11 texel, in a mipmap. T00, T01, T10, T11 as illustrated in FIG. 9 denote four texels in the mipmap. The texture filtering device 600 determines the center coordinate 940 located in a center of a coordinate of pixels. Furthermore, the texture filtering device 600 obtains color values of pixels included in a quad corresponding to an upper mipmap by using bilinear interpolation, based on the determined center coordinate 940, coordinates 900, 910, 920, and 930 located in a center of a coordinate of each texel corresponding to each pixel of the quad.

Tri-linear filtering performs linear interpolation (LERP) in a mipmap, such as a lower mipmap, of a higher-resolution and in a mipmap, such as a upper mipmap, of a lower resolution, respectively. In Equations, as presented below, T00, T01, T10 and T11 denote color values of texels, respectively. A calculation for performing linear interpolation of the center coordinate 940 of the pixels with respect to texels T10 and T11 is Equation 1, in which two multiplication operations and two addition operations are performed.

$$LERP = T10*(1-Wu) + T11*Wu \qquad \text{Equation 1}$$

In addition, a calculation performing bilinear interpolation (BiLERP) of the center coordinate 940 of the pixels with respect to texels T00, T01, T10 and T11 is Equation 2, in which eight multiplication operations and six addition operations are performed.

$$BiLERP = T00*(1-Wu)*(1-Wv) + T01*Wu*(1-Wv) + T10*(1-Wu)*Wv + T11*Wu*Wv \qquad \text{Equation 2}$$

Linear interpolation of the center coordinate 940 of the pixels with respect to texels T00 and T01 is Equation 3 as below if the linear interpolation is defined as a function LERP (T01, T00, Wu).

$$LERP(T01, T00, Wu) = T00*(1-Wu) + T01*Wu \qquad \text{Equation 3}$$

A calculation for obtaining color values by using bilinear interpolation BiLERP of the center coordinate 940 of the pixels with respect to texels T00, T01, T10 and T11 is Equation 4, in which the function of Equation 3 is used.

$$BiLERP = (1-Wv)*LERP(TT01, T00, Wu) + Wv*LERP(T11, T10, Wu) \qquad \text{Equation 4}$$

Furthermore, Equation 4 is represented as Equation 5 as below as performing linear interpolation on LERP (T01, T00, Wu) and LERP (T11, T10, Wu) with respect to Wv.

$$BiLERP = LERP(LERP(T11, T10, Wu), LERP(T11, T10, Wu), Wv) \qquad \text{Equation 5}$$

In addition, in an example, a tri-linear filtering value is represented as LERP (BiLERP (level 0), BiLERP (level 1), and LOD Weight). In this example, BiLERP (level 0) denotes the bilinear interpolation performed in the lower mipmap, BiLERP (level 1) denotes the bilinear interpolation performed in the upper mipmap. LOD Weight denotes an LOD value representing which of the upper mipmap and the lower mipmap is closer to the pixels in a quad. In this example, 24 multiplication operations and 24 addition operations in the lower mipmap and the upper mipmap are required for processing one quad, that is, four pixels. Furthermore, a total of 8 operations for multiplication and addition are required for bilinear interpolation between the lower mipmap and the upper mipmap. Therefore, a total of 56 multiplication operations and 56 addition operations are required for this processing task.

According to an embodiment, although calculations in the lower mipmap are the same as the calculations in the lower mipmap processor 630 of the embodiment of FIG. 6, a distance of pixels from the upper mipmap is closer and four pixels use an identical four texels, and thus, calculations are simplified while lowering accuracy. First, the center coordinate 940 of four pixels and a color value of the center coordinate 940 is be obtained in the upper mipmap, and a final color value of the pixels is obtained in the lower mipmap by using bilinear interpolation, as discussed. Accordingly, although 24 multiplication operations and 24 addition operations are required in the lower mipmap, only six addition operations and two shift operations are used for the upper mipmap as long as a formula for obtaining a center coordinate 700 of pixels is used. For example, when the coordinates of four pixels are P0 (x0, y0), P1 (x1, y1), P2 (x2, y2), and P3(x3, y3), a coordinate of Pcenter (xc, yc) that is the center coordinate 700 of the four pixels is represented by Equation 6, as below.

$$xc=(x0+x1+x2+x3)/4, yc=(y0+y1+y2+y3)/4 \quad \text{Equation 6}$$

As BiLERP requires being performed by using the center coordinate 940 of the pixels, two further multiplication operations and two addition operations are required. Therefore, a total of 34 multiplication operations, 40 addition operations, and two shift operations are performed, because 24 multiplication operations and 24 addition operations are performed in the lower mipmap, two multiplication operations, eight addition operations, and two shift operations are performed in the upper mipmap, and eight multiplication operations and eight addition operations are performed for linear interpolation of the lower mipmap and the upper mipmap.

Since a multiplication operation requires more hardware resources than an addition or a shift operation needs, a calculation amount is potentially reduced by using a method according to the present embodiment compared to an alternative method of generalized tri-linear filtering. Furthermore, a maximum number of texels required in an upper mipmap is nine when using the alternative method of generalized tri-linear filtering. However, as the method according to the present embodiment requires a maximum of only four texels, the number of memory accesses may be reduced.

Figure 10:
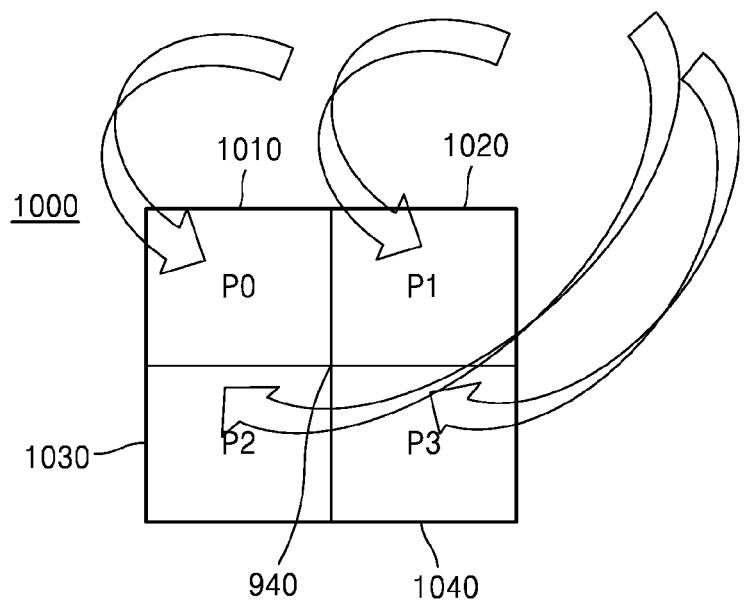
FIG. 10 is a view illustrating a method of texture filtering according to an embodiment.

FIG. 10 is a view illustrating a method of texture filtering according to an embodiment.

Referring to the example of FIG. 10, it is observable that BiLERP=LERP (LERP (T11, T10, Wu), LERP (T11, T10, Wu), Wv), which is the color value obtained corresponding to the center coordinate 940 of the pixels in FIG. 9, is a color value of pixel P0 1010, pixel P1 1020, pixel P2 1030 and pixel P3 1040 of a quad 1000 corresponding to an upper mipmap. For example, with respect to the center coordinate 940 of the pixels that is a center of the coordinates of pixel P0 1010, pixel P1 1020, pixel P2 1030 and pixel P3 1040, a color value bilinearly interpolated with a center coordinate and a color value of a texel as variables is a color value of each pixel of the quad 1000, corresponding to an upper mipmap.

Figure 11:
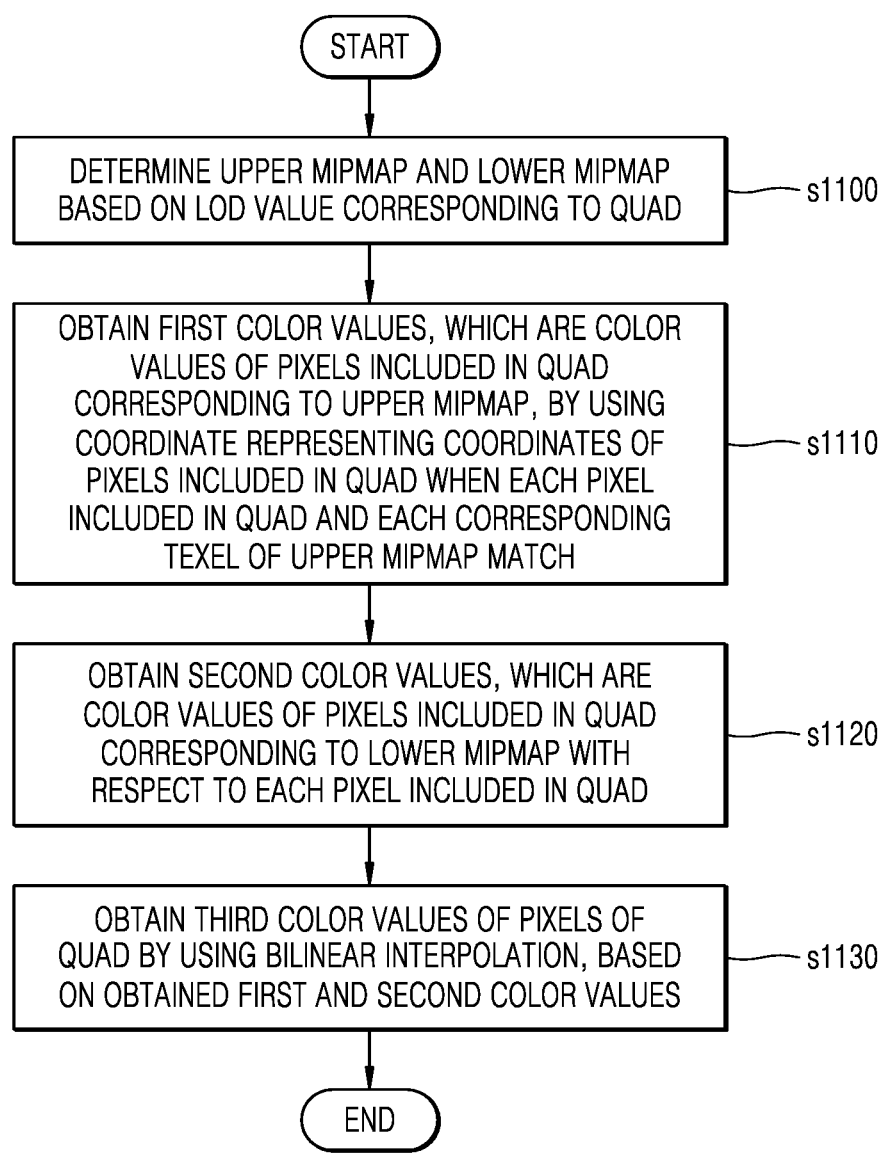
FIG. 11 is a flowchart illustrating a method of texture filtering according to an embodiment.

FIG. 11 is a flowchart illustrating a method of texture filtering according to an embodiment.

In operation s1100, an upper mipmap and a lower mipmap are determined based on an LOD value corresponding to a quad.

In operation s1110, when each pixel included in the quad and each corresponding texel of the upper mipmap match, first color values, which are color values of the pixels included in the quad, in which the color values of pixels correspond to the upper mipmap, are obtained by using a coordinate representing coordinates of the pixels included in the quad. For example, the coordinate representing coordinates of the pixels included in the quad includes a center coordinate located in a center of coordinates of pixels. In such an example, the first color values are obtained by using bilinear interpolation, based on a center coordinate, a coordinate located in a center of texels, and color values of texels, as discussed further, above.

In operation s1120, second color values, which are color values of the pixels included in the quad, in which the color values of the pixels correspond to the lower mipmap, are obtained with respect to each pixel included in the quad. For example, the second color values of the pixels of the quad, which are mapped in the lower mipmap by using bilinear interpolation, are based on a coordinate of each pixel of the quad, a center coordinate of each texel of the lower mipmap in which each pixel is mapped, and a color value of each texel of the lower mipmap.

In operation s1130, third color values of the pixels of the quad are obtained by using linear interpolation, based on the obtained first and second color values.

Figure 12:
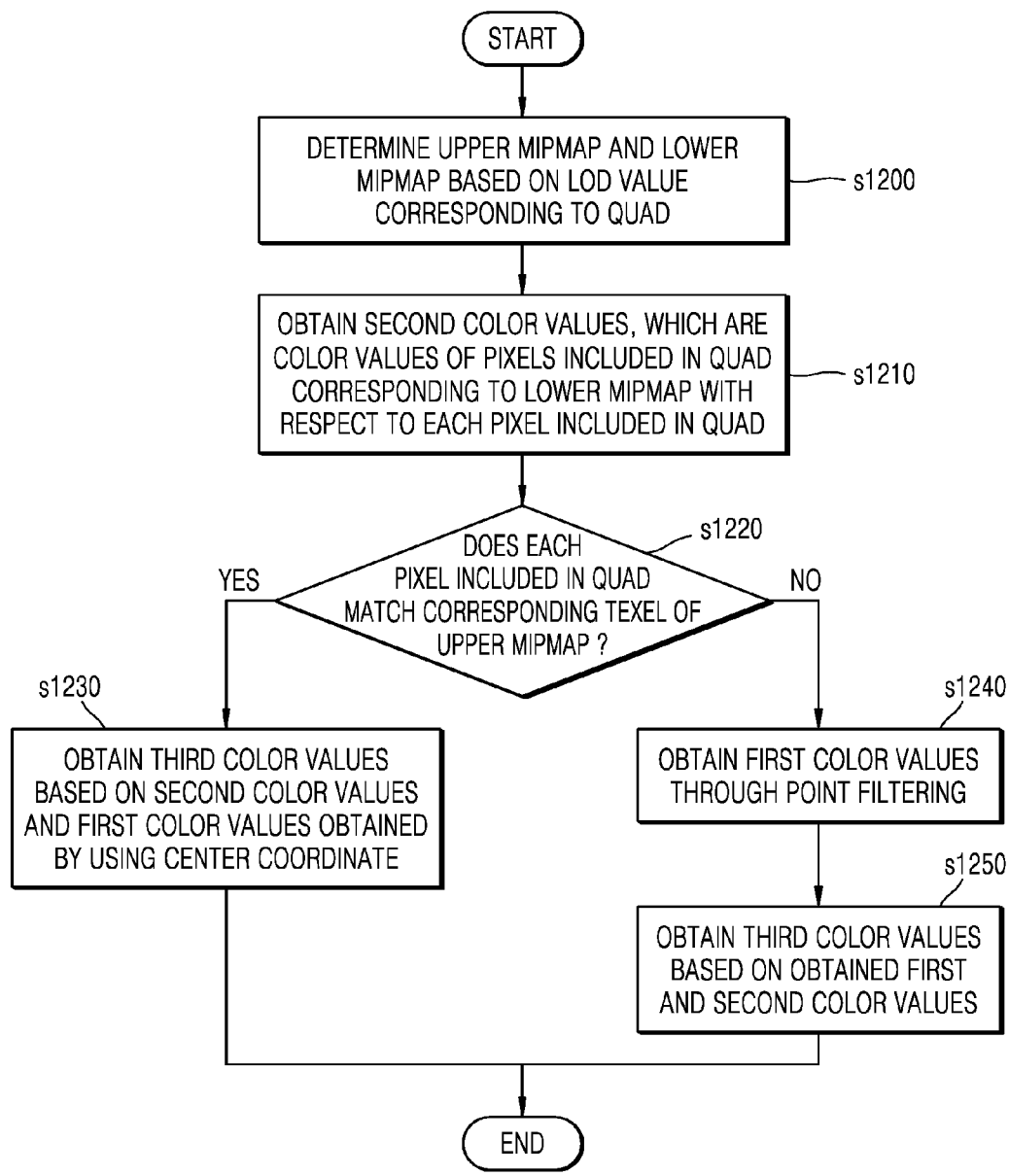
FIG. 12 is a flowchart illustrating a method of texture filtering according to another embodiment.

FIG. 12 is a flowchart illustrating a method of texture filtering according to another embodiment.

In operation s1200, the upper mipmap and the lower mipmap are determined based on the LOD value corresponding to the quad.

In operation s1210, second color values, which are color values of the pixels included in the quad, in which the color values of the pixels correspond to the lower mipmap, are obtained with respect to each pixel included in the quad. For example, the second color values of the pixels of the quad, which are mapped in the lower mipmap by using bilinear interpolation, are based on coordinate of each pixel of the quad, a center coordinate of each texel of the lower mipmap in which each pixel is mapped, and a color value of each texel of the lower mipmap.

In operation s1220, it is determined whether each pixel included in the quad matches a corresponding texel of the upper mipmap. For example, the first color values are obtained by using bilinear interpolation, based on a center coordinate, a coordinate located in a center of texels, and color values of texels, as discussed further, above.

When each pixel included in the quad and each corresponding texel of the upper mipmap match in operation s1220, in operation s1230, third color values are obtained based on the second color values and the first color values obtained by using the center coordinate.

In operation s1240, the first color values are obtained through point filtering, when each pixel included in the quad and each corresponding texel of the upper mipmap do not match in operation s1220. For example, the first color values are obtained by using a color value of a texel closest to the upper mipmap, in which each pixel of the quad is mapped.

In operation s1250, the third color values are obtained based on the obtained first and second color values. For example, the third color values of the pixels of the quad are obtained by using the obtained first and second color values.

Figure 13:
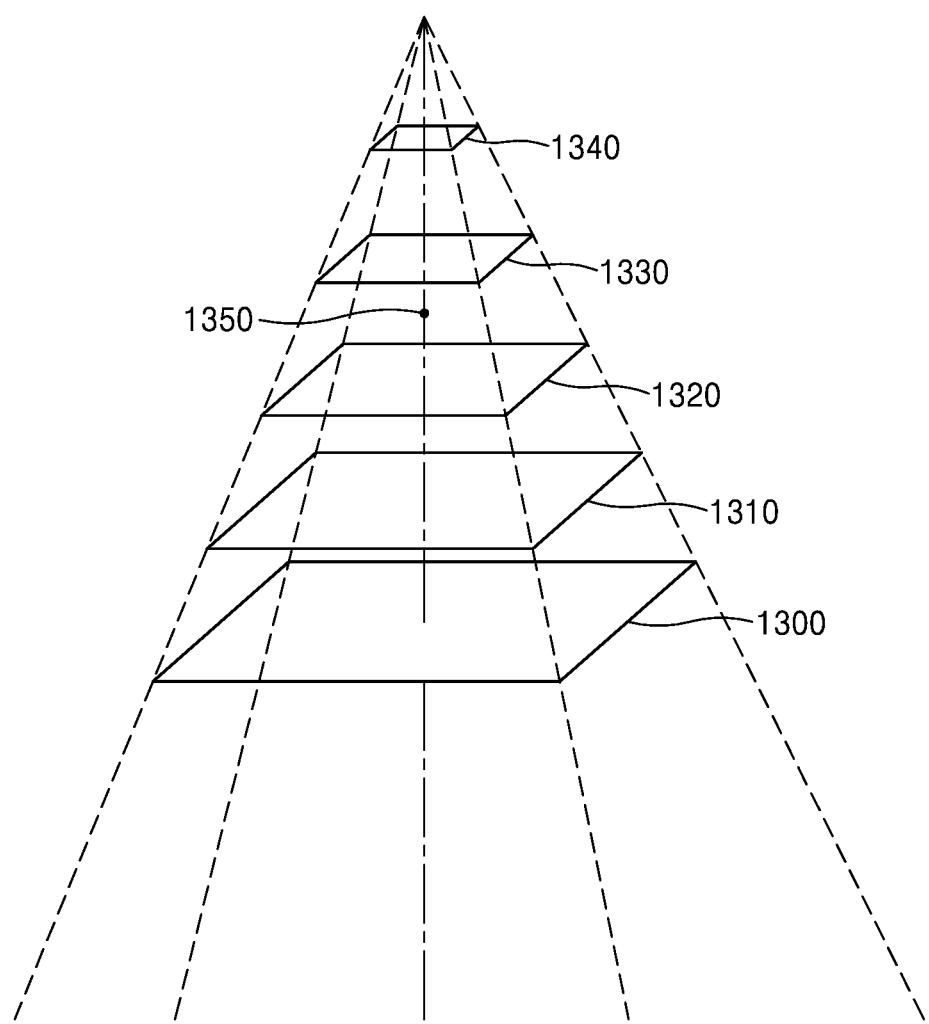
FIG. 13 is a view illustrating a method of determining a mipmap by using a level of detail (LOD) value, according to an embodiment.

FIG. 13 is a view illustrating a method of determining a mipmap by using a level of detail (LOD) value, according to an embodiment.

FIG. 13 illustrates a plurality of mipmaps. In an example of five mipmaps, an order of the mipmaps may be a first mipmap 1300, a second mipmap 1310, a third mipmap 1320, a fourth mipmap 1330 and a fifth mipmap 1340, ordered from the bottom. Accordingly, a resolution decreases in the same order. For such an example, it is assumed that the LOD value is 0 when a pixel is located in the first mipmap 1300 at the bottom and is 1 when a pixel 1350 is located in the fifth mipmap 1340 at the top. Therefore, in such an example, the LOD value is 0.25 when the pixel 1350 is located in the second mipmap 1310, the LOD value is 0.5 when the pixel 1350 is located in the third mipmap 1320, and the LOD value is 0.75 when the pixel 1350 is located in the fourth mipmap 1330.

For example with reference to FIG. 13, when the LOD value corresponding to the pixel 1350 in quad information received from the mipmap determiner 610 is 0.6, the pixel 1350 is between the third mipmap 1320 and the fourth mipmap 1330. Therefore, an upper mipmap corresponding to the pixel 1350 is the fourth mipmap 1330 and a lower mipmap is the third mipmap 1320.

Figure 14:
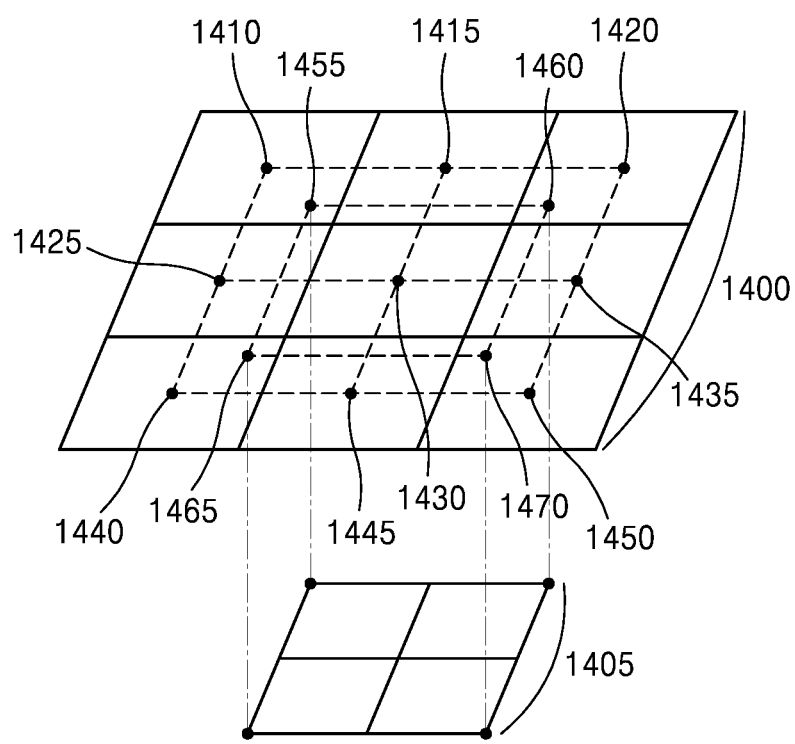
FIG. 14 is a view illustrating an example of point filtering with respect to an upper mipmap of a quad according to an embodiment.

FIG. 14 is a view illustrating an example of point filtering with respect to an upper mipmap 1400 of a quad 1405, according to an embodiment.

FIG. 14 illustrates the upper mipmap 1400 and the quad 1405. For example, the upper mipmap 1400 includes nine texels. In such an example, a center 1410 of a first texel, a center 1415 of a second texel, a center 1420 of a third texel, a center 1425 of a fourth texel, a center 1430 of a fifth texel, a center 1435 of a sixth texel, a center 1440 of a seventh texel, a center 1445 of a eighth texel, and a center 1450 of a ninth texel correspond to centers of texels in the upper mipmap 1400, respectively. IN this example, the quad 1405 includes four pixels. Each pixel of the quad 1405 is mapped in the upper mipmap 1400. For example, a first pixel 1455 of the quad 1405 is mapped to four texels including a first texel, a second texel, a fourth texel and a fifth texel. A second pixel 1460 of the quad 1405 is mapped to four texels including the second texel, a third texel, the fifth texel and a sixth texel. A third pixel 1465 of the quad 1405 is mapped to four texels including the fourth texel, the fifth texel, a seventh texel and a eighth texel. A fourth pixel 1470 of the quad 1405 is mapped to four texels including the fifth texel, the sixth texel, the eighth texel and a ninth texel. Therefore, in such an example, the number of texels of the upper mipmap, to which each pixel of the quad is mapped, is nine, from the first texel to the ninth texel. According to an embodiment, when the number of texels of the upper mipmap, in which each pixel of the quad is mapped, exceeds four, color values of the pixels included in the quad, in which the color values of pixels correspond to the upper mipmap, are obtained by using a color value of a texel closest to the upper mipmap, to which each pixel of the quad is mapped. Therefore, as the number of texels of the upper mipmap is nine, a color value of the first pixel 1455 is a color value of the fifth texel closest to the upper mipmap, to which the first pixel 1455 is mapped. Similarly, a color value of the second pixel 1460 is a color value of the fifth texel closest to the upper mipmap, to which the second pixel 1460 is mapped. Furthermore, a color value of the third pixel 1465 is a color value of the fifth texel closest to the upper mipmap, to which the third pixel 1465 is mapped. Lastly, a color value of the fourth pixel 1470 is a color value of the fifth texel closest to the upper mipmap, to which the fourth pixel 1470 is mapped. For example, such a method uses point filtering. The point filtering method possibly uses a smaller amount of calculation compared to bilinear interpolation, but may have a lower accuracy of a color value.

Figure 15:
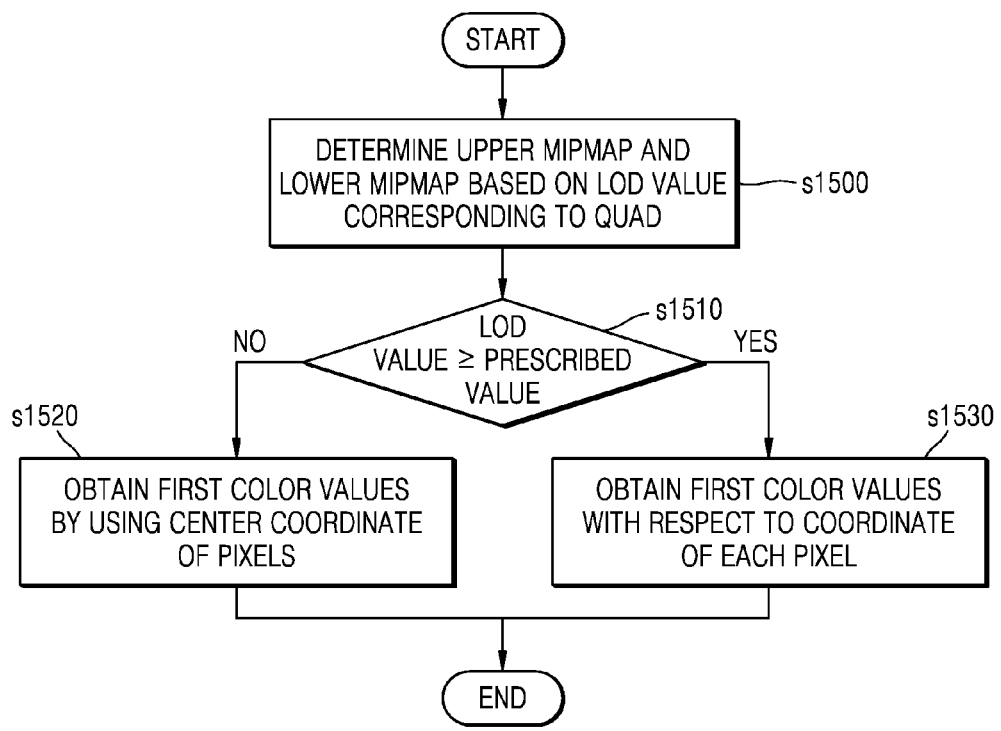
FIG. 15 is a flowchart illustrating a method of texture filtering according to another embodiment.

FIG. 15 is a flowchart illustrating a method of texture filtering according to another embodiment.

In operation s1500, an upper mipmap and a lower mipmap are determined based on an LOD value corresponding to a quad.

In operation s1510, it is confirmed whether the LOD value is greater than or equal to a prescribed value.

When the confirmed LOD value in operation s1510 is less than the prescribed value, in operation s1520, first color values are obtained by using a center coordinate of pixels. For example, the first color values are obtained by using bilinear interpolation, based on a center coordinate, a coordinate located in a center of texels, and color values of texels, as discussed further, above.

When the confirmed LOD value in operation s1510 is the same as or greater than the prescribed value, in operation s1530, first color values are obtained with respect to a coordinate of each pixel. For example, the first color values are obtained by using bilinear interpolation, based on a coordinate of each pixel of the quad, a center coordinate of each texel of the upper mipmap corresponding to each pixel of the quad, and a color value of each texel of the upper mipmap corresponding to each pixel of the quad.

Figure 16:
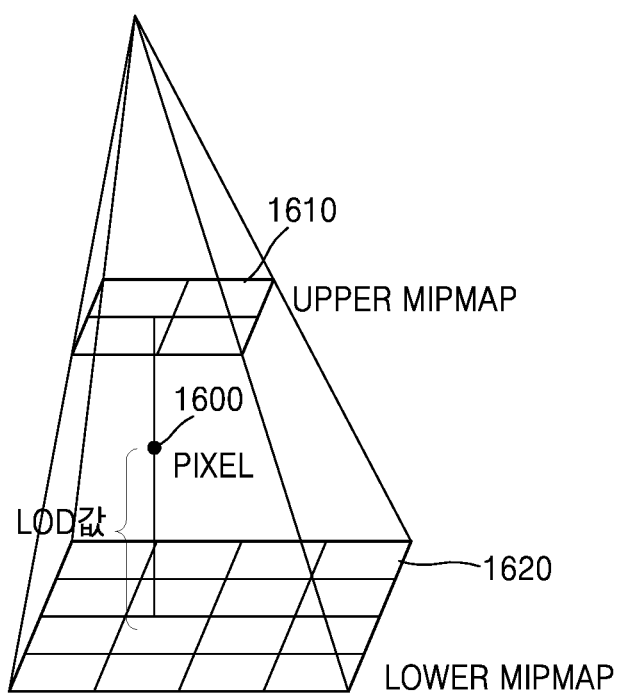
FIG. 16 is a view illustrating a method of texture filtering according to an LOD value, according to an embodiment.

FIG. 16 is a view illustrating a method of texture filtering according to an LOD value, according to an embodiment.

The method according to an embodiment with reference to the example of FIG. 16 determines the LOD value according to how close an upper mipmap 1610, a lower mipmap 1620 and a pixel 1600 are. For example, the LOD value is 1 when the pixel 1600 is located in the upper mipmap and is 0 when the pixel 1600 is located in the lower mipmap. In this example, the LOD value is between 0 and 1. Therefore, the pixel 1600 is close to the upper mipmap when the LOD value is larger than 0.5 and is close to the lower mipmap when the LOD value is less than 0.5.

According to such a method of performing tri-linear filtering by obtaining a center coordinate of pixels forming a quad in the upper mipmap, accuracy is considerably degraded when the LOD value is considerably high. Because a color value of a pixel is considerably affected by an upper mipmap because the pixel is closer to the upper mipmap as an LOD value is larger, total accuracy is considerably degraded when accuracy of an operation with respect to the upper mipmap is degraded. Therefore, if the LOD value is less than a prescribed value, for example, 0.5, color values of pixels included in a quad, in which the color values of pixels correspond to the upper mipmap, are obtained by using bilinear interpolation, based on a center coordinate located in a center of a coordinate of each pixel, a coordinate located in a center of each texel, and color values of texels, according to an embodiment. However, if the LOD value is same as or greater than a prescribed value, color values of pixels included in a quad, in which the color values of pixels correspond to the upper mipmap, are obtained by using bilinear interpolation, based on a coordinate of each pixel of the quad, a center coordinate of each texel of the upper mipmap corresponding to each pixel of the quad, and a color value of each texel of the upper mipmap corresponding to each pixel of the quad.

For example, since the pixel is closer to the upper mipmap because the LOD value is larger than 0.5 in the above example, a color value of each pixel corresponding to the upper mipmap and the lower mipmap is obtained by using bilinear interpolation, with respect to each pixel corresponding to the quad, equally in the upper mipmap and the lower mipmap. Next, a tri-linear filtering value or color value is obtained by using bilinear interpolation with respect to a color value of each pixel corresponding to the upper mipmap and the lower mipmap.

The apparatuses, units, modules, devices, and other components illustrated in FIGS. 1-16 that perform the operations described herein with respect to FIGS. 1-16 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-16. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-16 that perform the operations described herein with respect to FIGS. 1-16 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of texture filtering, the method comprising:
   determining an upper mipmap and a lower mipmap based on a level of detail (LOD) value corresponding to a quad, the quad compromised of four contiguous pixels forming a square block;
   determining whether the four pixels of the quad, when mapped to the upper mipmap, are collectively mapped at least partially, to only four texels of the upper mipmap such that the pixels match the four texels;
   if the pixels match the four texels, obtaining first color values, which are first partial color values of the pixels corresponding to the upper mipmap, by interpolation between at least two of the texels using a reference coordinate of the quad, and assigning the first color values to the pixels, with each pixel being assigned an identical first color value;
   if the pixels do not match the four texels, obtaining the first color values independently for each of the pixels;
   obtaining second color values, which are second partial color values of the pixels comprised in the quad, in which the second color values of the pixels correspond to the lower mipmap, with respect to each pixel comprised in the quad; and obtaining third color values of the pixels of the quad by using linear interpolation, based on the obtained first and second color values.

2. The method of claim 1, wherein
the reference coordinate comprises a center coordinate located in a center of coordinates of the pixels of the quad, and
the obtaining of the first color values comprises obtaining the first color values by using bilinear interpolation, based on the center coordinate, a coordinate located in a center of each of the of the four texels and a color value of each of the four texels.

3. The method of claim 1, wherein if the pixels do not match, the obtaining of the first color values independently comprises, for each pixel of the quad, using a color value of a closest texel to that pixel from the upper mipmap.

4. The method of claim 1, wherein
the determining of the upper mipmap and the lower mipmap comprises receiving information of the pixels comprising the quad and information of a mipmap to which the pixels of the quad are mapped, and determining the LOD value by using the received information.

5. The method of claim 1, wherein
the obtaining of the first color values comprises:
determining whether the LOD value is a prescribed value or greater, and
using bilinear interpolation, based on a coordinate of each pixel of the quad, a center coordinate of each texel of the upper mipmap corresponding to each pixel of the quad, and a color value of each texel of the upper mipmap corresponding to each pixel of the quad, when the determined LOD value is the same as or greater than the prescribed value.

6. The method of claim 1, wherein
the obtaining of the second color values comprises obtaining the second color values of the pixels of the quad, which are mapped in the lower mipmap by using bilinear interpolation, based on a coordinate of each pixel of the quad, a center coordinate of each texel of the lower mipmap to which each pixel of the quad is mapped, and a color value of each texel of the lower mipmap mapped to each pixel.

7. The method of claim 1, wherein
the upper mipmap comprises a low-resolution mipmap and the lower mipmap comprises a high-resolution mipmap.

8. A non-transitory computer-readable storage medium storing instructions for causing computing hardware to perform the method of claim 1.

9. A device for texture filtering, the device comprising:
mipmap determiner hardware configured to determine an upper mipmap and a lower mipmap based on a level of detail (LOD) value corresponding to a quad, the quad comprised of four contiguous pixels in a square region;
an upper mipmap processor configured to: determine whether the four pixels of the quad, when mapped to the upper mipmap, are collectively mapped at least partially to only four texels of the upper mipmap such that pixels match the texels; if the pixels match the four texels, obtain first color values, which are first partial color values of the pixels corresponding to the upper mipmap, by interpolation between at least two of the texels using a reference coordinate of the quad, and assign an identical first color value to each of the pixels; if the pixels do not match the four texels, obtain the first color values independently for each of the pixels;
a lower mipmap processor configured to obtain second color values, which are second partial color values of the pixels comprised in the quad, in which the second color values of the pixels correspond to the lower mipmap, with respect to each pixel comprised in the quad; and
pixel value determiner hardware configured to obtain third color values of the pixels of the quad by using bilinear interpolation, based on the determined first and second color values.

10. The device of claim 9, wherein
the reference coordinate comprises a center coordinate located in a center of coordinates of the pixels comprised in the quad, and
the upper mipmap processor is further configured to obtain the first color values by using bilinear interpolation, based on the center coordinate, a coordinate located in a center of each texel corresponding to the pixels comprised in the quad, and a color values of each texel corresponding to the pixels comprised in the quad.

11. The device of claim 9, wherein the upper mipmap processor is further configured to obtain the first color values independently for each pixel of the quad if the pixels do not match by using a color value of a closest texel to that pixel from the upper mipmap.

12. The device of claim 9, wherein
the mipmap determiner hardware is further configured to receive information of the pixels comprising the quad and information of a mipmap to which the pixels of the quad are mapped, and to determine the LOD value by using the received information.

13. The device of claim 9, wherein
the upper mipmap processor is further configured to determine whether the LOD value is the same as or greater than a prescribed value, and to obtain the first color values by using bilinear interpolation, based on a coordinate of each pixel of the quad, a center coordinate of each texel of the upper mipmap corresponding to each pixel of the quad, and a color value of each texel of the upper mipmap corresponding to each pixel of the quad, when the determined LOD value is the same as or greater than the prescribed value.

14. The device of claim 9, wherein
the lower mipmap processor is further configured to obtain the second color values of the pixels of the quad, which are mapped in the lower mipmap by using bilinear interpolation, based on a coordinate of each pixel of the quad, a center coordinate of each texel of the lower mipmap to which each pixel of the quad is mapped, and a color value of each texel of the lower mipmap mapped to each pixel.

15. The device of claim 9, wherein
the upper mipmap comprises a low-resolution mipmap and the lower mipmap comprises a high-resolution mipmap.

16. A device for texture filtering, the device comprising:
mipmap determiner hardware configured to determine an upper mipmap and a lower mipmap based on a level of detail (LOD) value corresponding to a quad, the quad comprised of four contiguous pixels in a square region, the lower mipmap having a higher resolution than the upper mipmap;
an upper mipmap processor configured to:
determine whether the LOD value is the same as or greater than a prescribed value, if so, obtain first color values independently for each of the pixels by using bilinear interpolation between texels of the upper mipmap corresponding to each of the pixels, and a color value of each texel of the upper mipmap corresponding to each of the pixels, wherein the first color values are first partial color values of the pixels; and if the LOD value is below the prescribed value, obtain the first color values by interpolation between at least two of the texels using a reference coordinate of the quad and assign an identical first color value to each of the pixels;

a lower mipmap processor configured to obtain second color values, which are second partial color values of the pixels comprised in the quad, in which the second color values of the pixels correspond to the lower mipmap, with respect to each pixel comprised in the quad; and pixel value determiner hardware configured to obtain final color values of the pixels of the quad by using bilinear interpolation, based on the determined first and second color values.

17. The device of claim 16, wherein the reference coordinate comprises a center coordinate located in a center of the quad.

* * * * *